UNITED STATES PATENT OFFICE.

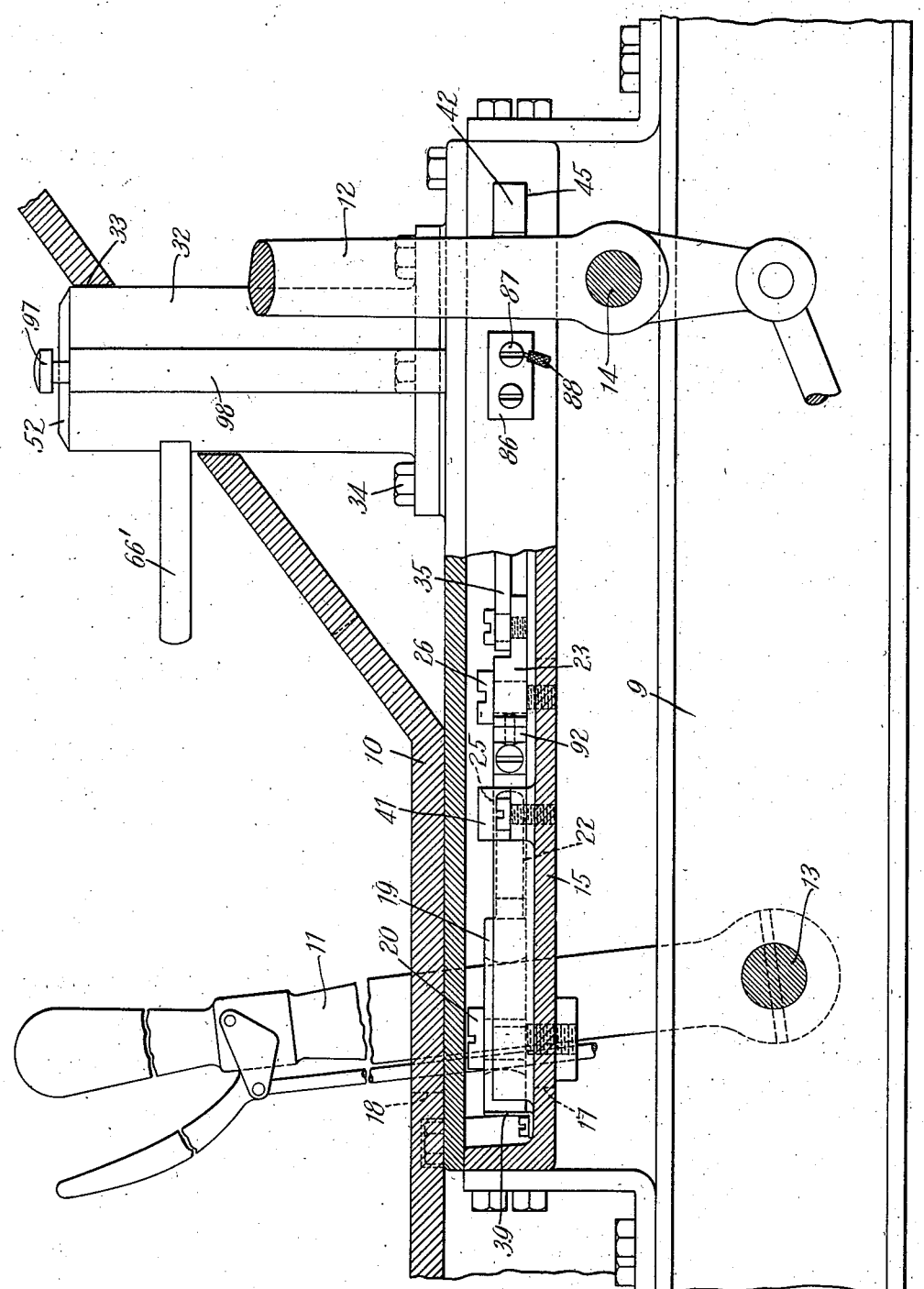

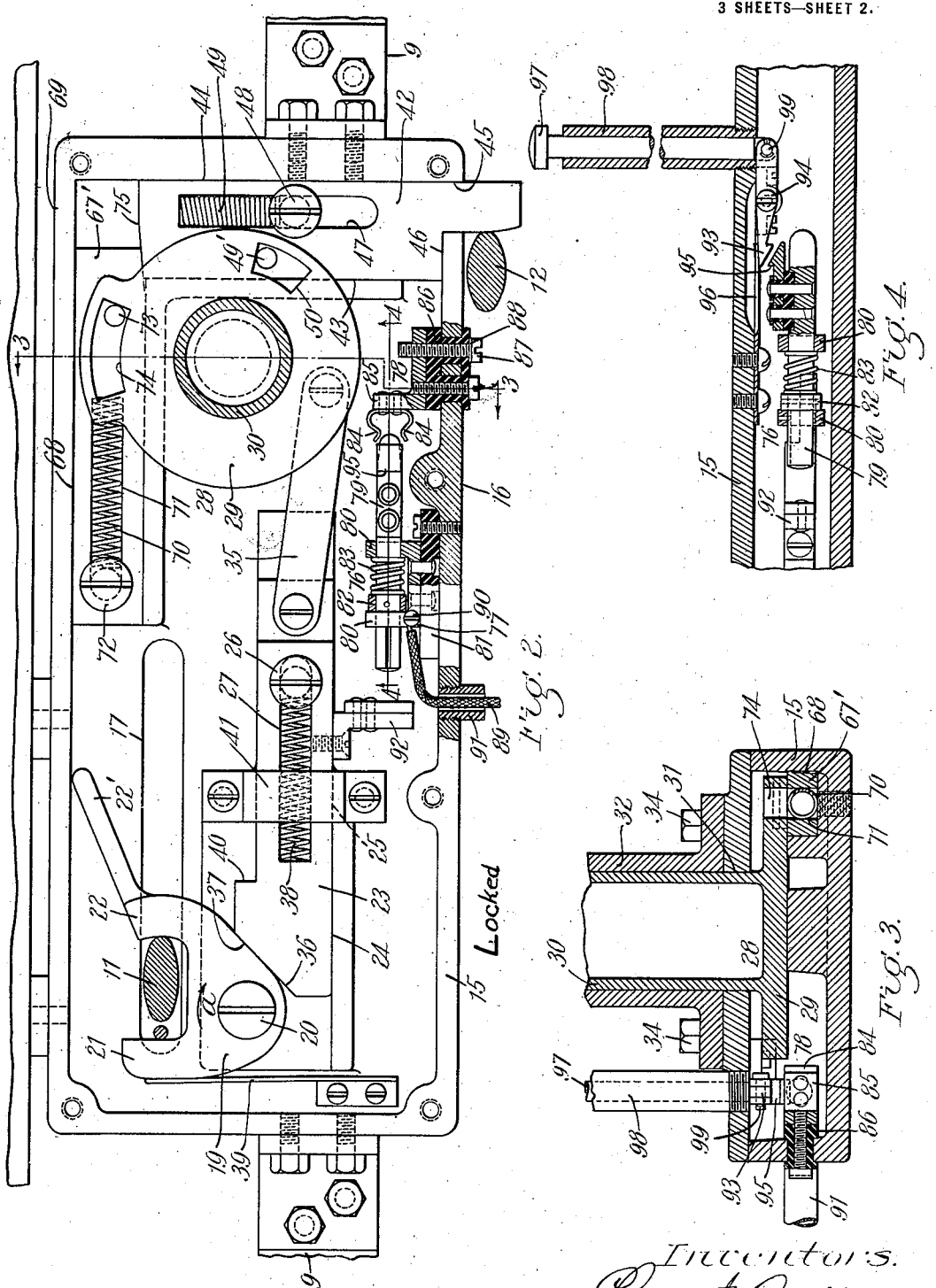

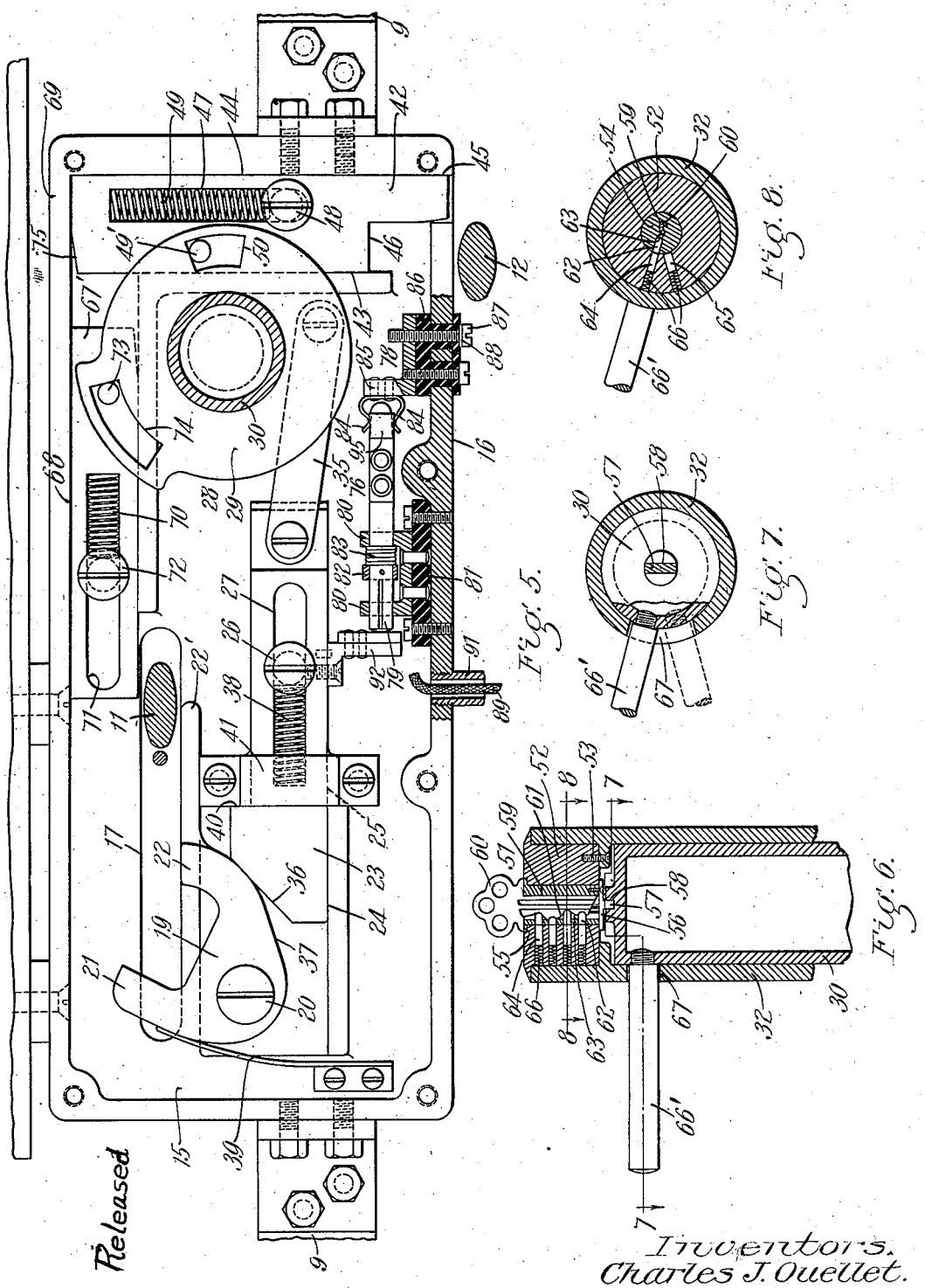

CHARLES J. OUELLET AND AMOS J. OUELLET, OF CAMBRIDGE, MASSACHUSETTS.

LOCKING DEVICE FOR MOTOR-VEHICLES.

1,211,217.

Specification of Letters Patent.

Patented Jan. 2, 1917.

Application filed March 24, 1915. Serial No. 16,750.

*To all whom it may concern:*

Be it known that we, CHARLES J. OUELLET and AMOS J. OUELLET, citizens of the United States, residing at Cambridge, in the county of Middlesex and State of Massachusetts, have invented new and useful Improvements in Locking Devices for Motor-Vehicles, of which the following is a specification.

This invention relates to improvements in locking devices for motor vehicles and is particularly, though not exclusively, adapted to the motor vehicle known as the "Ford" automobile.

The object of this invention is to provide a simple and strong device for locking certain of the operating levers of the vehicle in such positions that the vehicle cannot be set into operation without the knowledge or the consent of the person authorized to operate the same.

The object of the invention is further to provide a locking mechanism for a plurality of moving parts of the vehicle, but all of which locking instrumentalities are controlled by a single or a common actuating means.

The invention consists in the combination and arrangement of parts whereby the above objects and certain other objects hereinafter appearing may be attained, as set forth in the following specification and particularly pointed out in the claims.

Referring to the drawings, Figure 1 is a section illustrating portions of the floor, frame and operating levers of a motor vehicle with a device embodying our invention shown in connection therewith. Fig. 2 is a plan view, partly in section, of the device illustrated in Fig. 1 with the operating levers shown locked in their inoperative positions. Fig. 3 is a section taken on the line 3—3 of Fig. 2. Fig. 4 is a longitudinal section taken substantially on the line 4—4 of Fig. 2 with certain parts of the device broken away to save space in the drawings. Fig. 5 is a plan view of the device similar to Fig. 2, but with the operating levers shown unlocked with one of said levers moved forward. Fig. 6 is a detail sectional view of the lock. Fig. 7 is a transverse section of the lock taken on the line 7—7 of Fig. 6. Fig. 8 is a transverse section of the lock taken on the line 8—8 of Fig. 6.

Like numerals refer to like parts throughout the several views of the drawings.

In the drawings, 9 is the frame and 10 the floor of a motor vehicle preferably of the type of car known as the "Ford" to which this device, as hereinbefore stated, is particularly adapted, although it is not necessarily limited to this type of car, but may be attached to any car employing levers for throwing in clutches, shifting gears or applying brakes. When applied to the "Ford" car this device is preferably employed in connection with the hand lever 11 of the car, the chief function of which is to hold the clutch of the vehicle, not shown in the drawings, in a neutral position. This lever when pulled back as far as it will go also acts to apply the emergency brake of the vehicle to the rear wheel. This device is also adapted for use in connection with another lever 12 which in the type of machine referred to is the clutch lever and operates the clutch by means of which the car is started and its operations largely controlled. When this lever is pressed forward the clutch engages the low speed gear. When half-way forward the gears are in neutral position or disconnected from the driving mechanism. When the hand lever 11 is thrown forward and the clutch lever 12 is released and permitted to return to its normal position, the high speed gears of the car will be thrown into operation. Thus it will be seen that the levers 11 and 12 coöperate with each other to control the operations of the vehicle, but should their use be prevented it will be impossible to start the vehicle.

The lever 11 is secured to a shaft 13 journaled in the frame 9, which shaft is operatively connected with the several mechanisms which are controlled by the movements of said hand lever. The lever or pedal 12 is secured or mounted upon a shaft 14 from which other mechanisms are controlled. A casing 15 is secured to the body of the car, preferably beneath the platform or floor 10, and upon the side frame 9 in such a position that the pedal 12 will move parallel with said casing and in close proximity to the side 16 thereof, see Fig. 2. The hand lever 11 is adapted to operate through slots 17 and 18 in the bottom and cover respectively of the casing 15.

The preferred method of accomplishing the desired result is to provide obstructions which may be locked within or outside of the paths of the operating levers 11 and 12, preferably when the hand lever 11 is moved to its extreme or rear position and the emergency brake of the vehicle is applied. The obstruction for the operating lever 11 preferably consists of a bifurcated rocker member or latch 19 pivotally mounted upon a stud 20 upon the interior of the casing 15. The furcations 21 and 22 of the latch 19, when said latch is in its normal and closed position, extend transversely of the slots 17 and 18 upon opposite sides of said operating lever, as shown in Fig. 2, this position indicating the extreme rear position of said operating lever which at this time is at the rear ends of the slots 17 and 18.

A slide 23 is arranged to reciprocate within and longitudinally of the casing 15 in guides 24 and 25 and a screw 26 extending through a slot 27 provided in said slide 23. An actuator 28 is provided for said slide within said casing and consists preferably of a disk 29 having an axial extension or hub 30. The hub 30 projects outwardly from the casing and through an opening 31 and into a tubular casing 32 which constitutes a journal or bearing for said disk, said tubular casing projecting upwardly and through an opening 33 in the floor 10 of the car.

The tubular casing 32 is secured to the casing 15 preferably by screws 34 arranged beneath the floor 10. The slide 23 and actuator 28 are operatively connected together by a link 35 pivotally connected at its opposite ends to the members 23 and 29. The end of the slide 23 is beveled at 36 to engage a corresponding beveled face 37 formed upon the latch 19.

The face 37 is engaged by the beveled portion 36 of the slide 23 when it is desired to obstruct the movements of the hand lever 11 in the manner illustrated in Fig. 2, thus preventing the rocking of the latch 19 in the direction of the arrow "a." A spring 38 is arranged in the slot 27 and is adapted to yieldingly retain said slide in contact with the latch 19.

The inclination of the beveled face 37 is of such a degree that pressure applied against the furcation 22 of the latch 19, by means of the lever 11 in attempting to operate said lever, will not be sufficient to cause the slide 22 to be withdrawn or moved from beneath the latch 19. These beveled faces however assist the spring 38 in more readily positioning the obstruction or latch in its normal position.

A spring 39 is arranged to engage the latch 19 adjacent the furcation 21 thereof and tends to rock said latch upon its pivot 20 in the direction of the arrow "a," or in opposition to the spring 38. When the slide 23 is withdrawn and the operating lever 11 is moved about its axis along the slot 17, the latch 19 will be rocked upon its pivot 20 by the spring 39 until the furcation 22 has been withdrawn from the path of the lever 11.

The movement of said latch is limited by the slide 23, which is permitted to move toward the right, see Fig. 1, only until a shoulder 40 on said slide contacts with a bracket 41 which constitutes the guide 25. The rocking movement of said latch is not however sufficient to withdraw the furcation 21 from across the slot 17, as will be seen in Fig. 5, thus said furcation will remain in the path of the lever 11 and be engaged thereby when said lever is returned to its normal position, causing said latch to be likewise returned to its normal position.

The obstruction for the lever 12 preferably consists of a sliding bolt 42 arranged to reciprocate transversely of the casing 15 between guides 43 and 44 and is adapted to protrude through an opening 45 in the wall 16 of said casing. The protruding portion of said bolt rests immediately in advance of the lever 12 when said lever is in its rearmost position, as shown in Figs. 1 and 2, thus preventing the forward movement of said lever. A shoulder 46 on said bolt engages the inner face of the wall 16 and limits the distance to which said bolt shall protrude from said casing.

The bolt 42 is slotted longitudinally at 47 to receive a stud 48 and a spring 49, said spring engaging said stud at one end of said slot for the purpose of retracting said bolt within said casing. The actuator 28 is common to the slide 23 and the bolt 42 and is operatively connected with said bolt preferably by means of a pin 49' projecting upwardly therefrom and through a slot 50, which slot is elongated to permit of a slight lost motion between said disk and said bolt and to permit the spring 49 to yieldingly act upon the bolt 42 to retract the same.

The actuator 28 is provided with a lock mechanism 51 preferably arranged in the upper end of the tubular casing 32 and preferably consists of a tumbler casing 52 secured within the upper end of the tubular casing 32 by screws 53 extending into said tumbler casing from the interior of said tubular casing. A cylindrical plug 54 is rotatably arranged within the tumbler casing 52, said plug having an annular shoulder 55 at its upper end adapted to limit the longitudinal movement thereof, while a disk 56 is secured to the inner end of said plug and prevents the withdrawal of said plug from said casing.

The disk 56 is adapted to interlock with the upper and outer end of the axial extension 30 through the instrumentalities of a tongue 57 formed on said disk engaging a groove 58 arranged at the outer end of said extension, thus when said extension is rotated said plug will necessarily be rotated also.

The plug 54 is provided with an irregular slot 59 extending longitudinally thereof and adapted to receive a key 60, said key having an irregularly serrated edge 61 adapted to receive tumblers 62 which are arranged within said plug 54 and of such lengths that when said key 60 is within its slot in said plug, said tumblers will all aline with the face 63 of said plug. The tumbler casing 52 is also provided with two series of tumblers 64 and 65 arranged in holes which aline with the tumblers 62. Springs 66 yieldingly retain said tumblers 64 in contact with the tumbler 62 when said sets of tumblers are in alinement and the key in position within the slot, permitting said plug to be rotated. The two series of tumblers 64 and 65 represent the two extreme positions occupied by the actuator 28, thus when said key is withdrawn at either one of said positions said actuator will be held or locked in that position. A handle 66' extends from the hub 30 outwardly through a slot 67 in the tubular casing 32 in a convenient position above the floor 10 for the operator of the vehicle to manipulate, whereby said actuator may operate when unlocked from one position or the other as desired.

In the construction of the device, as hereinbefore described, the obstructions for the levers 11 and 12 are maintained in their locking positions through the instrumentalities of the tumblers in the series 64 and to relieve said pins of the entire burden of maintaining said levers in their locked positions, a locking slide 67' has been provided, said slide being arranged to reciprocate in a groove 68 formed in the casing 15 adjacent the rear end of the bolt 42. Said locking slide 67' is arranged to reciprocate in a path extending transversely of the path of movement of the bolt 42 and between the rear end 75 of said bolt and the rear wall 69 of the casing.

A spring 70 is arranged within a slot 71 formed in said locking slide and engages a stud 72 also extending through said slot for the purpose of securing and holding the slide 67' in its position in the groove 68 and at the same time serves as an abutment for the spring 70.

The slide 67' is operatively connected with the disk 29 by means of a pin 73 which extends through a segmental slot 74 formed in said disk and of such a length that it will permit the locking slide 67' to be yieldingly moved between the rear end 75 of said bolt and the rear wall 69 of the casing, when said bolt is protruding from the casing as in Fig. 2. When the disk 29 is first rotated to withdraw said bolt from said lever 12, the locking slide 67' will be directly in the path of said bolt and prevent the withdrawal of said bolt. The slot 50 is therefore provided in the disk 29 to permit a partial rotation of said disk before engaging the pin 49, which movement is sufficient to permit said disk to withdraw the locking slide 67' from behind said bolt, but immediately upon being released by said locking slide 67' the spring within said bolt urges said bolt to its rearmost position. The actuator disk 29 also operates a switch mechanism 76 to close an electric circuit including a pair of terminals 77 and 78 inclosed within the casing 15.

The switch mechanism 76 preferably embodies in its construction a slide 79 arranged to reciprocate in guides 80 mounted within the casing 15 and insulated therefrom by insulating material 81. A collar 82 is secured to the slide 79 and is engaged by a spring 83 which has an abutment against one of the guides 80.

The slide 79 is adapted to be moved against the action of the spring 83, between a pair of contacts 84 secured to an abutment 85 which in turn is mounted within the casing and insulated therefrom by insulating material 86. The contacts 84 and the abutment 85 constitute the terminal 78 and to said terminal is secured, by means of a screw 87, one of the electric wires 88 included in the ignition circuit, or preferably the circuit including the lamps of said vehicle. The other electric circuit terminal 77 consists of a wire 89 secured by means of a screw 90 to a bracket comprising the guides 80 through which the switch slide 79 is arranged to reciprocate. The wire 89 extends from the screw 90 outwardly from said casing through a pipe 91 which prevents said wire from being tampered with. The slide 79 is operated to connect said terminals by means of a lug 92 carried by the slide 23, said lug being adapted to engage the end of said slide 79 when said slide 23 is being withdrawn to free the lever 11 and thus push said slide between the contacts 84.

A catch 93 is pivoted at 94 within the casing 15 and engages a tooth 95 on the slide 79 when said slide 79 is in contact with the contacts 84, thus maintaining the switch mechanism closed and the terminals 77 and 78 connected. A spring 96 yieldingly retains said catch in contact with the tooth 95. By means of the spring catch 93 the switch mechanism may be maintained closed even though the levers 11 and 12 are locked in their inoperative positions which permits the operator of the car to leave the lamps of the vehicle lighted when he so desires, provided they are electric lamps. This catch is however adapted to be manually operated so that said slide may be released and the terminals disconnected. For this purpose a push pin 97 is arranged to project from the casing 15 through a tube 98 and above the floor 10 of said car where it may be easily and conveniently operated.

The lower end of the pin 97 is pivotally attached at 99 to the catch 93 in such a manner that by depressing said push pin 97 the catch 93 will be withdrawn from the tooth 95, permitting the springs 83 to return the slide 79 to its normal position, as illustrated in Figs. 2 and 4.

As a safety device for preventing the abutments 19 and 42 from being moved into their locking positions, when the clutch lever 11 is forward, the furcation 22 of the latch 19, which constitutes the obstruction for said lever, is provided with an extension 22'. This extension, when said latch is thrown out of the path of said lever, as in Fig. 5, lies along and substantially parallel with the side of the slot 17 and overlaps the lever 11, when in its forward position, thus absolutely preventing the rocking of said latch into its obstructing position until said operating lever 11 has been returned to its normal position between the furcations 21 and 22 of said latch.

The general operation of the device hereinbefore specifically described is as follows: Assuming that the vehicle is inoperative and the operating levers 11 and 12 are in the positions indicated in Fig. 2, the operator places the key 60 in the slot 59 to unlock the plug 54. He then grasps the handle 66' and moves the same from the full line position in Fig. 7 to the dotted line position therein, setting into motion the disk 29. The first part of the movement of said disk 29 causes the pin 73 to engage the right hand end of the slot 74 and thereby withdraws the locking slide 67' from the end of the bolt 42, which bolt at this time is permitted to remain stationary by reason of the slot 50. As the locking slide 67' clears said bolt 42 the spring 49 withdraws said bolt from the path of the lever 12, permitting said lever to be operated when desired. Simultaneously with the movement of the slide 67' the slide 23 through the link 35 is withdrawn from the latch 19 and the spring 39 rocks said latch upon its pivot 20 into the position illustrated in Fig. 5, leaving the lever 11 free to be operated when desired. The movement of said slide 23 also causes the lug 92 to engage the switch slide 79 to move said slide toward the right Fig. 2 into contact with the contacts 84, thereby connecting the electric circuit terminals 77 and 78. The vehicle is now in a condition to be started and operated. After the vehicle has been stopped and the levers 11 and 12 returned to their normal positions and it is desired to lock the same in said positions, the operator returns the handle 66' to the full line position Fig. 7 which causes the bolt 42 to be operated to protrude from the casing in the path of the lever 12 and the slide 23 to engage the latch 19 and rock the same from the position illustrated in Fig. 5 to that illustrated in Fig. 2, thus obstructing the path of the lever 11 and preventing further movement thereof. The switch 76 at this time is left closed in order that the lamps of the vehicle may remain lighted. If this is not desired the operator depresses the push pin 97 to release the slide 79 permitting the spring 83 to return said slide to its inoperative normal position, thus disconnecting the terminals 77 and 78. The key 60 is then withdrawn from the slot 59 leaving the vehicle safely and securely locked.

Having thus described our invention what we claim and desire by Letters Patent to secure is:

1. In combination, a pair of operating levers, a casing, means in said casing adapted to obstruct the movements of said levers, a pair of electric circuit terminals in said casing, a switch arranged within said casing and adapted to connect said terminals, a common actuating means for said obstructions and said switch, and locking means for said common actuating member.

2. In combination, a pair of operating levers, a casing, means in said casing adapted to obstruct the movements of said levers, a pair of electric circuit terminals in said casing, a switch arranged within said casing and adapted to connect said terminals, a common actuating means for said obstructions and said switch, a spring catch adapted to automatically lock said switch in a position to connect said terminals, means adapted to return said switch to its disconnected position, and locking means for said common actuating member.

3. In combination, a pair of operating levers, a casing, means in said casing adapted to obstruct the movements of said levers, a pair of electric circuit terminals in said casing, a switch arranged within said casing and adapted to connect said terminals, a common actuating means for said obstructions, and said switch, a spring catch adapted to automatically lock said switch in a position to connect said terminals, means adapted to permit an independent release of said switch from said spring catch, a spring adapted to return said switch to its disconnected position, and locking means for said common actuating member.

4. In combination, a casing provided with slots arranged in opposite walls thereof, an operating lever adapted to project through said casing within said slots, a latch arranged within said casing and adapted to engage and be operated by said operating lever, a slide in said casing adapted to be moved to engage said latch and to prevent the movements of said operating lever, an actuator operatively connected with said slide, and locking means for said actuator.

5. In combination, a fixed casing, an operating lever extending through said casing, a bifurcated rocker member arranged to straddle said operating lever within said casing, said rocker member being adapted to be moved when said operating lever is operated, a slide in said casing adapted to prevent the rocking of said rocker member, an actuator operatively connected to said slide, and locking means for said actuator.

6. In combination, an operating lever, an obstruction adapted to obstruct the movements of said operating lever when the same is in its inoperative position, means adapted to move said obstruction into and out of the path of said operating lever, and an extension on said obstruction disposed in the direction of the operative position of said operating lever adapted to engage said operating lever and prevent the movement of said obstruction into the path of said operating lever when said operating lever is in its operative position.

7. In combination, a casing, an operating lever adapted to extend through said casing, said casing having slots adapted to permit the operation of said lever, a pivoted bifurcated member within said casing and adapted to straddle said operating lever when said lever is in its inoperative position, one of the furcations of said member constituting an obstruction adapted to prevent the operation of said operating lever, means to lock said bifurcated member in its obstructing position, said bifurcated member being adapted to be rocked upon its pivot to release said operating lever, and means on said bifurcated member adapted to engage said operating lever to prevent said obstruction from being moved into the path of said operating lever when said operating lever is out of its inoperative position.

8. In combination, a pair of operating levers, means adapted to obstruct the movements of said levers when said levers are in their inoperative positions, and means on one of said obstructions adapted to engage its operating lever and prevent both of said obstructions from being moved into the paths of their respective operating levers when said levers are in their operative positions.

9. In combination, an operating lever, an obstruction adapted to be moved to obstruct the movements of said operating lever, a locking member adapted to be moved to retain said obstruction in its obstructing position, an actuator constructed and arranged to move said obstruction into its obstructing position, said actuator also being adapted to operate said locking member, and means for locking said actuator against movement.

10. In combination, an operating lever, a casing arranged adjacent to said operating lever, a bolt in said casing adapted to be moved to protrude from said casing and obstruct the movements of said operating lever, a locking member arranged to move in said casing transversely of said bolt to retain said bolt in its protruding position, an actuator constructed and arranged to move said bolt into its protruding position, said actuator also being adapted to operate said locking member, and means for locking said actuator against movement.

11. In combination, an operating lever, a casing arranged adjacent to said lever, a bolt in said casing adapted to be moved to protrude from said casing and obstruct the movements of said operating lever, means to retract said bolt, an actuator for moving said bolt to protrude from said casing, a locking member arranged in said casing, means adapted to move said locking member into a position at the rear of said bolt, when said bolt is protruding from said casing, to prevent the retraction thereof, means on said actuator adapted to withdrawn said locking member from said bolt, and means for locking said actuator against movement.

12. In combination, an operating lever, a casing arranged adjacent to said lever, a bolt in said casing adapted to be moved to protrude from said casing and to obstruct the movements of said operating lever, means to yieldingly retract said bolt, an actuator for positively moving said bolt to protrude from said casing, a locking slide arranged in said casing, means adapted to yieldingly move said locking slide into a position at the rear of said bolt, when said bolt is protruding from said casing, to prevent the retraction thereof, means on said actuator adapted to withdraw said locking slide from said bolt, and means for locking said actuator against movement.

In testimony whereof we have hereunto set our hands in presence of a subscribing witness.

CHARLES J. OUELLET.
AMOS J. OUELLET.

Witness:
SYDNEY E. TAFT.